3,056,824
TRANSESTERIFICATION PROCESS FOR PRODUCING NONSYMMETRICAL PHOSPHITE TRIESTERS AND PRODUCTS RESULTING THEREFROM
Arthur C. Hecker, Richmond Hill, Olga H. Knoepke and William E. Leistner, Brooklyn, and Mark W. Pollock, New York, N.Y., assignors to Argus Chemical Corporation, a corporation of New York
No Drawing. Filed July 13, 1956, Ser. No. 597,594
17 Claims. (Cl. 260—461)

This invention relates to the process of substituting an aliphatic group for one or more aryl groups in triaryl phosphites. In a representative preparation, triphenyl phosphite is converted to a mono-, di-, or trialkyl phosphite with the liberation of 1, 2 or 3 moles of phenol.

Some of the compounds made as described herein have been previously prepared, as by the reaction of phosphorus trichloride with alcohol in the presence of a tertiary amine or ammonia. Products so made are impure.

Also attempts have been made to prepare the alkyl esters of phosphorus acid by heating the aryl esters with aliphatic alcoholates in the proportion of 1 mole of sodium alcoholate or the like for each aryl group to be replaced by an alkyl. The product so made is indefinite and unreliable in composition to such extent that the information on this reaction has been described as "quite scanty and confusing" (Kosolapoff, Organophosphorus Compounds, 1950, page 191). At best there is formed a complicated mixture including, as one component, a sodium phenolate in stoichiometric proportion, the reaction for substituting three ethyl groups in triphenyl phosphite, for instance, being theoretically

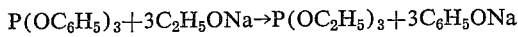

$$P(OC_6H_5)_3 + 3C_2H_5ONa \rightarrow P(OC_2H_5)_3 + 3C_6H_5ONa$$

We have now discovered a means of making alkyl substitutions in aryl phosphites (but not in phosphates) with good yields of product of such purity that the analysis for trivalent phosphorus in the product approaches the theoretical closely and with the use of only a catalytic proportion of alkali or alkaline earth metal in the form of the alcoholate or hydroxide. In fact, the amount of the metal used is so small that it is not necessary to purify the final product, from the metal or any compound thereof, for such use of the product as a stabilizer of polyvinyl chloride and like resins.

It is significant that an aliphatic alcohol, in contact with a trace of the selected metal, is effective in substituting from the original phosphite ester a phenol of boiling point above the alcohol, that is it is not necessary to remove the replaced phenol from the mixture as the reaction progresses, and that good replacement of the aryl by the alkyl component to the extent desired occurs when the whole system is heated until reaction is substantially complete. The phenol so liberated is removed, at the end of the reaction, as by distillation.

The invention comprises the herein described process of substituting an aliphatic radical, on an equivalent basis, for the aryl radical of a triaryl phosphite. The invention comprises also certain new compounds resulting from said replacement including monoisooctyl diphenyl phosphite.

As to materials, we use any of the common commercial aryl phosphites of which examples are triphenyl, tricresyl, and trixylenyl phosphites. There is no advantage known to us in using less common or less economical aryl phosphite esters.

We use any aliphatic alcohol, as one within the range 1–18 carbon atoms to the molecule, such as ethyl normal or secondary butyl, dodecyl, octadecyl, and benzyl alcohol, the benzyl radical of the latter being aliphatic in the sense that the term is used by us. In replacing more than 1 aryl group by the aliphatic group, we use to advantage a $C_2$–$C_{18}$ alcohol such as one of those named. Also we may use polyhydric alcohols, as, for example, ethylene glycol, any propylene or butylene glycol, glycerine, pentaerythritol, or sorbitol. It is understood that 1 mole of the polyhydric alcohols may replace 2 aryl groups when the polyhydric alcohol used is a diol and 3 aryl groups when a triol and that unesterified hydroxyl will remain when there is used as much as 2 moles of any of the polyols for 1 mole of the triaryl phosphite or 1 mole or more of pentaerythritol or sorbitol for 1 mole of the said phosphite.

The alcohol as well as the aryl phosphite are used in commercially anhydrous condition.

The metal used is any one of the alkali or alkaline earth metals. Sodium is entirely satisfactory and is the one ordinarily selected.

The proportions of the selected aliphatic alcohol and triaryl phosphite are approximately stoichiometric. Thus there are used 1, 2 or 3 moles of a monohydric aliphatic alcohol to replace 1, 2 or 3 aryl radicals, respectively, from the original phosphite. We may use a slight excess such as 5% or so of the alcohol over such stoichiometric proportion to produce the substitution of the aryl component to the extent desired.

The catalytic proportion of the metal to be used in the substitution of the aliphatic for the aryl component of the phosphite ester is extremely small as for example 0.05–1 part for 100 parts of the aliphatic alcohol. Larger amounts are unnecessary, uneconomical, and, because of the proportion of metal compound that would be left in the product, are undesirable.

The alkali or alkaline earth metal is suitably introduced into the mixed aliphatic alcohol and triaryl phosphite in the form of the free metal. It then reacts with the alcohol present to give an alcoholate, wtih any trace of water present in the alcohol or aryl phosphite, to give the hydroxide of the metal, or with both water and the alcohol, in case water is present in proportion that is appreciable but less than that required to consume all of the said metal, to give mixed alcoholate and hydroxide.

As to conditions of operation, the selected alcohol, triaryl phosphite ester, and metal may be mixed in any order. It is convenient to mix them together before the heating is started, as by introducing the metal in elemental form into the mixed alcohol and phosphite ester in a suitable container and under a reflux condenser. The three materials are then heated together, the metal reacting quickly to give alcoholate, hydroxide or both, depending upon the proportion, if any, of water present.

The whole is heated until the substitution of aliphatic for the aryl component has reached the desired state. When the ingredients have been proportioned approximately stoichiometrically, the reaction is continued at the elevated temperature until there is no further change in observable properties such as boiling point of the mixture. The period of heating required is usually about 2–5 hours.

When the reaction has reached the stage of the desired substitution, the heating is discontinued. Then the phenol or other arylhydroxy compound or homolog liberated is distilled in vacuo. Any remaining unesterified aliphatic alcohol may also be distilled unless the alcohol is particularly high boiling as in the case of certain ones of the polyols, in which case the proportion of alcohol used originally is carefully controlled so as to avoid unreacted alcohol.

The invention will be further illustrated by description in connection with the following specific examples of the practice of it, proportions here and elsewhere herein being expressed as parts by weight unless specifically stated to the contrary.

EXAMPLE 1

Triisooctyl Phosphite 0.2 part of sodium metal was dissolved in 195 parts (1.5 mole) of commercial isooctanol derived from the Oxo process. 155 parts of triphenyl phosphite (0.5 mole) were added. The mixture was heated to 120° C. for 3 hours. The liberated phenol was then stripped off by distillation under reduced pressure, at 9–10 mm. pressure and at 75°–90° C. 139 parts of solid phenol distilled (calculated theory 141 parts).

*Analysis of still residue.*—P 7.30%, calc. 7.42%; $n_D^{25}$ 1,4520; sp. gr.$_{29°}$ 0.900.

EXAMPLE 2

Diisooctyl Monocresyl Phosphite 176 parts of tricresyl phosphite (0.5 mole) were added to a solution of 0.2 part potassium metal in 130 parts isooctyl alcohol (1 mole). The mixture was heated to 120° C. for 3 hours. Stripping off cresol, as described for phenol in Example 1, yielded 107 parts (theory 108 parts).

*Analysis.*—P 7.65%, calc. 7.83%; $n_D^{25}$ 1,4841; sp. gr.$_{29°}$ 0.954.

When no catalyst was used in the same procedure, only liquid distillate, predominately isooctanol, was stripped off.

EXAMPLE 3

Monoisooctyl Diphenyl Phosphite 130 parts isooctanol (1 mole) were mixed with 0.7 part of 50% aqueous sodium hydroxide solution and 310 parts of triphenyl phosphite. After treating the reaction mixture as described in Examples 1 and 2, 92 parts phenol were obtained as a distillate (theory 94 parts).

*Analysis.*—P 8.82%, calc. 8.93%; $n_D^{25}$ 1,5190; sp. gr.$_{29°}$ 1,035.

EXAMPLE 4

104 parts commercial neopentylglycol, 0.1 part sodium and 310 parts triphenyl phosphite were heated at 130° C. for 3 hours and 186 parts phenol then stripped off instead of 188 parts calculated.

*Analysis.*—P 13.71%, calc. 13.44%; $n_D^{25}$ 1,5157; sp. gr.$_{29°}$ 1,135.

EXAMPLE 5

The procedure of Example 4 was repeated with 1,4 butanediol, 1,6 octanediol, and pentaerythritol, used separately in equivalent proportions, in place of the neopentylglycol of the said example. With the first two substitutions, the products obtained were highly viscous liquids. With the pentaerythritol, the product obtained was a solid.

EXAMPLE 6

The procedures of Examples 1–3 are followed in turn with the replacement of the metal there used by an equal weight of any of the other alkali or alkali earth metals, with the replacement of the aryl phosphites used by any of the other aryl phosphites shown herein, and with the replacement of the monohydric alcohol used in these examples by ethyl, butyl, hexyl, or dodecyl alcohol and by an equivalent weight of any of the following polyols: 2-ethylhexane-1,3-diol, 1,6 hexanediol, and 1,12 octadecanediol (from hydrogenated and reduced castor oil).

EXAMPLE 7

In this example, the metal used as catalyst is replaced by an amine. For this purpose we use a basic primary, secondary or tertiary amine having a boiling point so elevated that the amine is retained in the system under heating conditions, as, for example, boiling above 100° C. and being soluble in the proportion used in the selected aliphatic alcohol.

Examples of such amines that may be used in place of the metal are monododecyl amine, monododecyl monomethyl amine, monododecyl dimethyl amine, diethyl aniline, quinoline, and triethanol amine.

The selected amine compound is used in the proportion of about 0.1–2 and ordinarily 0.1–1 part for 100 parts of the aliphatic alcohol. Thus 1.5 parts of monododecyl amine is mixed with 195 parts of the commercial isooctanol and 155 parts of triphenyl phosphite. The mixture is then heated to 150° C. for 6 hours and the thus reacted mixture is subjected to vacuum distillation, at about 9–10 mm. pressure and at 75° C.–90° C., to distill out the liberated phenol. Triisooctyl phosphite remains in the still.

This procedure is repeated with any one of the amines listed, in proportion by weight equal to that of the dodecyl amine substituted.

EXPLANATION OF ANALYSES

In all of the analyses given above, the "P" reported is trivalent phosphorus, i.e., tertiary phosphorus.

This phosphorus was determined by a method based upon the oxidation of the trivalent phosphorus to pentavalent phosphorus with hydrogen peroxide in isopropanol. The sample to be analyzed is treated with an excess of about 0.2 normal solution of hydrogen peroxide and titrated back with potassium iodide and sodium thiosulfate in the usual way. Back titration of the excess peroxide is done after 2 minutes' standing with the potassium iodide solution, in order to avoid consumption of the free iodine by any secondary phosphite present. Secondary phosphites react with iodine but cannot react with hydrogen peroxide.

It will be understood that it is intended to cover all changes and modifications of the examples of the invention herein chosen for the purpose of illustration which do not constitute departures from the spirit and scope of the invention.

We claim:

1.

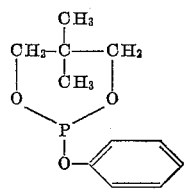

2. A process of preparing the cyclic phosphite

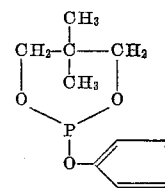

comprising heating 1 mole of neopentyl glycol with at least about 1 mole of triphenyl phosphite in the presence of an alkaline catalyst.

3. A method of preparing a phosphite having at least one aliphatic substituent comprising reacting a triaryl phosphite with at least one but less than three moles per mole of phosphite of a saturated aliphatic alcohol under substantially anhydrous conditions in the presence of an alkaline catalyst.

4. The method of claim 3 wherein the triaryl phosphite is selected from the group consisting of triphenyl, tricresyl and trixylenyl phosphites.

5. The method of claim 3 wherein the saturated aliphatic alcohol is a polyhydric alcohol.

6. The method of claim 5 wherein two aryl groups per molecule of the triaryl phosphite are replaced by one aliphatic group derived from the polyhydric alcohol.

7. The method of claim 5 wherein three aryl groups per molecule of the triaryl phosphite are replaced by one aliphatic group derived from the polyhydric alcohol.

8. The method of claim 5 wherein the polyhydric alcohol is a glycol containing from two to eighteen carbon atoms.

9. The method of claim 5 wherein the polyhydric alcohol is selected from the group consisting of glycerine, sorbitol and pentaerylthritol.

10. A method as in claim 3 wherein the phosphite produced is a mixed aryl-alkyl compound of the formula

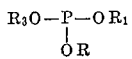

wherein from one to two of the R groups are aryl and the remaining R groups are saturated aliphatic groups, said phosphite being prepared by reacting at least one and less than three moles of a saturated aliphatic monohydric alcohol with a triaryl phosphite.

11. The method of claim 10 wherein the triaryl phosphite is selected from the group consisting of triphenyl, tricresyl and trixylenyl phosphites.

12. The method of claim 3 wherein the catalyst is an alkali metal.

13. The method of claim 3 wherein the catalyst is an alkaline earth metal.

14. The method of claim 3 wherein the catalyst is a metal alcoholate.

15. The method of claim 3 wherein the catalyst is an alkaline hydroxide.

16. The method of claim 3 wherein the catalyst is a basic organic amine.

17. The product produced by the method of claim 5.

References Cited in the file of this patent

UNITED STATES PATENTS

| | | |
|---|---|---|
| 2,326,140 | Gzemski | Aug. 10, 1943 |
| 2,353,558 | Gzemski | July 11, 1944 |
| 2,728,790 | Sroog | Mar. 11, 1954 |
| 2,834,798 | Hechenbleikner | May 13, 1958 |
| 2,839,563 | Hechenbleikner | May 13, 1958 |

OTHER REFERENCES

Milobendzki et al.: Chem. Polsk. 15, 16 (1917).

Milobendzki et al.: "Chem. Abst.," vol. 13, page 2867 (1919).

Ruggenberg et al.: Jour. Am. Chem. Soc. 70, 1802–3 (1948).

Kosolapoff: "Organophosphorus Compounds," John Wiley & Sons, New York, N.Y. (1951), page 191.

Groggins: "Unit Processes in Organic Synthesis, 4th ed., McGraw-Hill Book Co., New York (1952), pages 616–619.

Landauer et al.: "J. Chem. Soc.," pages 2224–2234 (1953).

Hoffman et al.: T.A.C.S. 78, 5817–5822 (1956).

UNITED STATES PATENT OFFICE
CERTIFICATE OF CORRECTION

Patent No. 3,056,824            October 2, 1962

Arthur C. Hecker et al.

It is hereby certified that error appears in the above numbered patent requiring correction and that the said Letters Patent should read as corrected below.

Column 2, line 36, for "wtih" read -- with --; column 5, lines 11 to 14, the formula should appear as shown below instead of as in the patent:

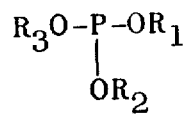

Signed and sealed this 26th day of March 1963.

(SEAL)
Attest:

ESTON G. JOHNSON

Attesting Officer

DAVID L. LADD

Commissioner of Patents